June 11, 1929. W. F. IRRGANG 1,716,585
TURN UNDER STITCHING DEVICE
Filed June 6, 1927 2 Sheets-Sheet 1

INVENTOR.
William F. Irrgang
BY
Edward Taylor
ATTORNEY.

June 11, 1929.　　W. F. IRRGANG　　1,716,585
TURN UNDER STITCHING DEVICE
Filed June 6, 1927　　2 Sheets-Sheet 2

INVENTOR.
William F. Irrgang
BY
Edward C. Taylor
ATTORNEY.

Patented June 11, 1929.

1,716,585

UNITED STATES PATENT OFFICE.

WILLIAM F. IRRGANG, OF CHICOPEE, MASSACHUSETTS, ASSIGNOR TO THE FISK RUBBER COMPANY, OF CHICOPEE FALLS, MASSACHUSETTS, A CORPORATION OF MASSACHUSETTS.

TURN-UNDER STITCHING DEVICE.

Application filed June 6, 1927. Serial No. 196,796.

This invention relates to tire building apparatus and has particular reference to the stitching around and under the beads of the carcass plies and chafing strips of flat built tires.

One object of the invention is to provide a quick and simple apparatus occupying only a small space and offering no interference with the performance of the rest of the operations upon the tire for stitching the material inwardly around the tire beads. A further object is to provide such an apparatus which is readily adjustable for different widths of tire casings. A further object is to provide such an apparatus which will exert a progressive pressure around the beads without danger of wrinkling the material.

Referring to the drawings.

Figure 2:
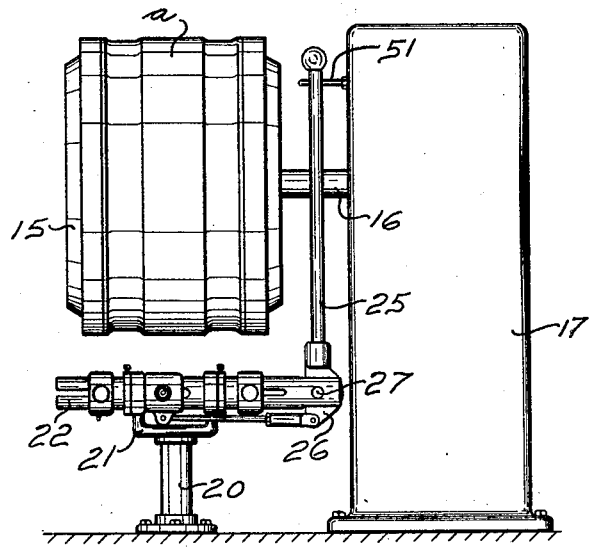
Fig. 2 is a front elevation thereof.
Figure 3:
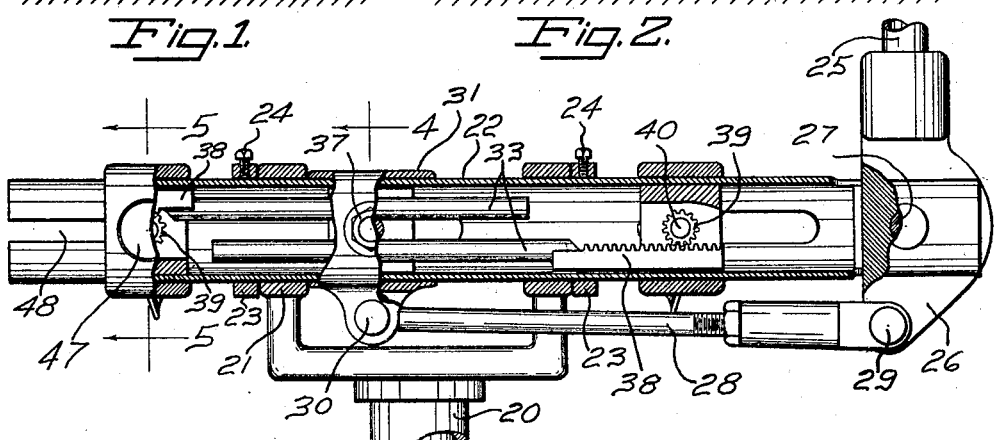
Fig. 3 is a view corresponding with a part of Figure 2 taken on a larger scale and with certain elements broken away to reveal the construction within.
Figure 7:
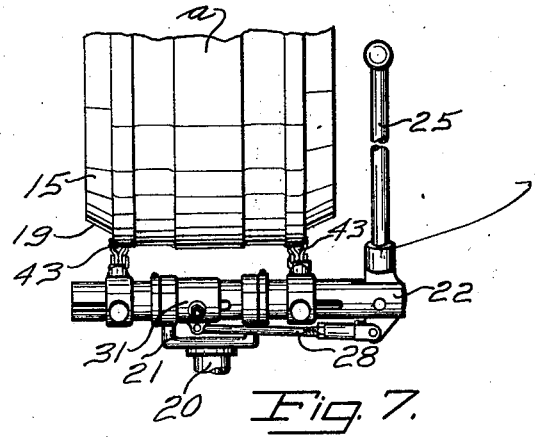
Figure 8:
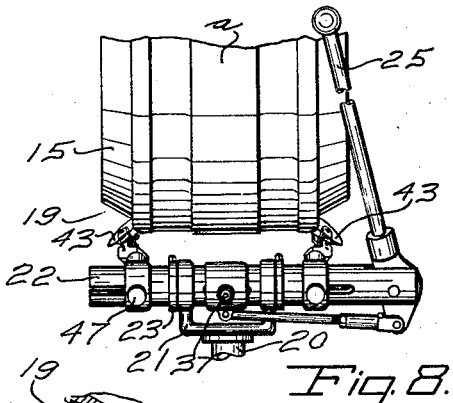
Figure 9:
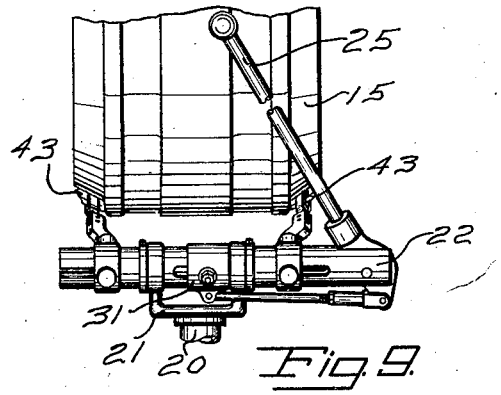

Figs. 7, 8, and 9 are views similar to Fig. 2 but illustrating successive steps in the operation of the device; and Figs. 10, 11, 12, and 13 are diagrammatic views showing the operation of folding the material around the bead anchorages.

My improved apparatus has been shown as associated with a tire building drum 15, preferably of the usual collapsible type, upon which the tire casing $a$ is built up by hand or by mechanism not necessary to describe here. This drum is carried upon a shaft 16 projecting into a frame or housing 17 in which is provided mechanism for rotating the shaft at the speed desired. The manner of rotating the drum is old and well known and forms no part of my invention. Instead of the usual straight or beveled shoulder at the side of the drum, however, I form the drum 15 with side channels 18 preferably cut away on the arc of a circle and merging into sloping portions 19. This construction is best shown in Figs. 10 to 13 which illustrate clearly the function of these channels in allowing the stitching rolls to work around the beads and onto the bottom sides thereof.

The apparatus constituting my present invention operates upon the tire $a$ to fold the marginal portions $b$ of the last ply and the chafing strip $c$ around the bead wires. This apparatus is supported upon a pedestal 20 having a yoke 21 formed at its top. Through bearings in the yoke passes a tube 22 having collars 23 fixed by set screws 24 upon either side of the yoke. This permits the tube to rotate within the yoke but prevents any longitudinal motion. At one end of the tube is a handle 25 having a narrow blade 26 at its lower end extending into a slot in the tube and pivoted to the tube at 27. A link 28 is pivoted at 29 to the lower end of the blade 26 and at 30 to a sleeve 31 sliding upon the tube 22.

Figure 4:
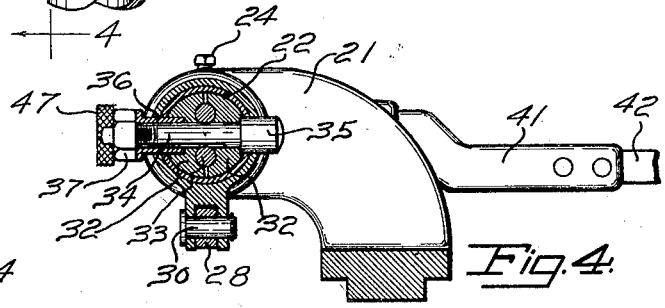
Fig. 4 is a section on line 4—4 of Fig. 3.
Figure 5:
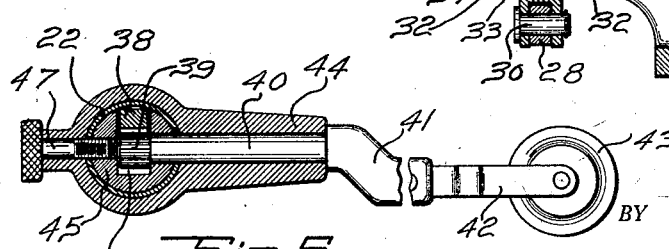
Fig. 5 is a section on line 5—5 of Fig. 3.

Within the tube 22 at a point encircled by the sleeve 31 is a split cylinder 32 having longitudinal holes through which extend rods 33. A bolt 34 (Fig. 4) has an enlargement 35 at one end passing through a hole in the sleeve 31 and the tube 22 and has at the other end a spacing collar 36 likewise passing through a hole in these parts. A nut 37 threaded onto the end of the bolt and bearing against the collar 36 draws the enlargement 35 and the collar together and consequently compresses against the rods 33 the two halves of the split cylinder against which the enlargement and the collar bear. Secured respectively to opposite ends of the rods 33 are racks 38 each meshing with a pinion 39 on the round shank 40 of an offset arm 41 which carries the stitching mechanism. There is, as illustrated, one of these offset arms near each end of the tube so that both tire beads are operated upon simultaneously. At the end of each of these offset arms is mounted a yoke 42 in which is pivoted the stitching roll 43. The arms and rollers are preferably so mounted that when in the position of Fig. 6 the axes of the arms 41 make one or two degrees less than a right angle with a line drawn from the center of shaft 16 to the center of roller 43, so that the axes of the arms 41 and the axes of yokes 42 make an angle of between 87° and 90° with a plane joining the axis 16 of the tire support 15 with the centers of the rolls 43. The axes of rolls 43 being at right angles to the axes of their supporting yokes 42, rotate in a plane passing substantially through the axis 16 of the tire support, or a few degrees to the left of it as viewed in Fig. 6. This gives what I believe to be the best condition with respect to the avoidance of wrinkles in the folding of the carcass materials around the beads. The shank 40 of the arm extends into a bushing 44 slidably fitted upon the tube 22 as best shown in Fig. 5. Inside the tube at this point is a cylinder 45 having a groove 46 cut in it and adapted to receive the pinion 39 attached to the shank 40. The rack 38 at the corresponding end of the tube also runs in this groove. A screw 47 passes loosely through a hole in the bushing and through a slot 48 in the end of the tube and is threaded into cylinder 45. By tightening the screw the tube 22 is clamped tightly between the cylinder 45 and the bushing 44.

Figure 1:
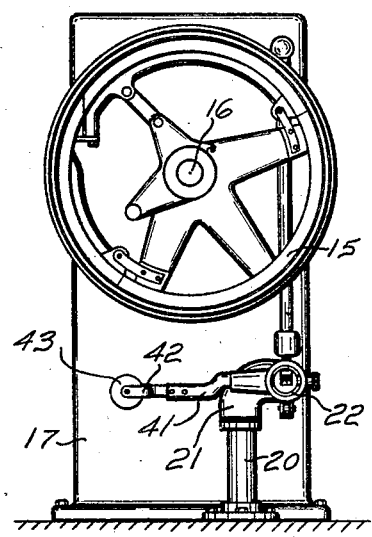
Fig. 1 is a side elevation of a machine to which my invention has been applied.
Figure 6:
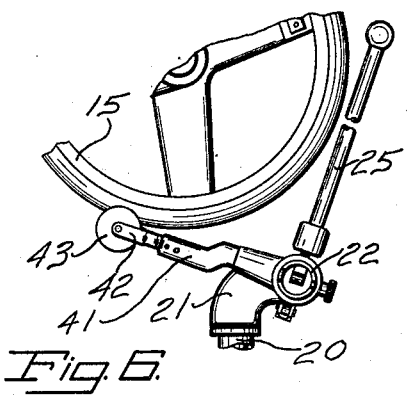
Fig. 6 is a view corresponding to Fig. 1 but showing the parts in a different position of operation.
Figure 11:
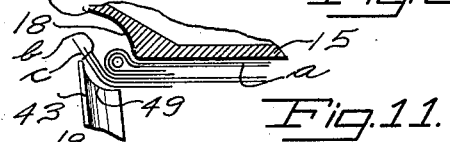
Figure 10:
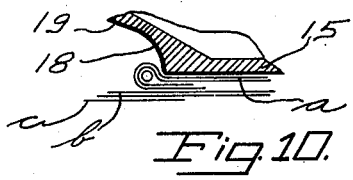
Figure 12:
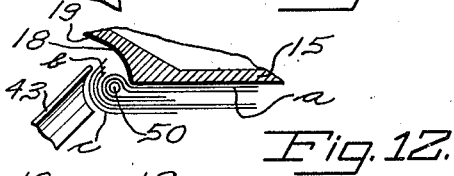
Figure 13:
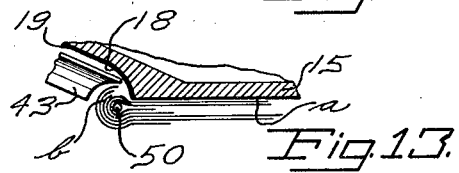

Fig. 1 shows the inactive position of the parts in which they remain while the tire is being formed on the drum 15. In this position the weight of the parts holds the handle 25 against a stop 51. After the tire has been completed except for the turning of the marginal portions inwardly around the beads the handle 25 is drawn toward the operator, assuming him to be in front of the machine as in Fig. 2, causing the tube 22 to be rocked and the rollers 43 swung up into contact with the tire beads as shown in Figs. 6, 7, and 11. Still pulling the handle towards him in order to exert a constant pressure upon the beads the operator then moves the handle to the left as viewed in Fig. 7, passing through the stage of Fig. 8 into that of Fig. 9. This motion shifts the sleeve 31 up and through the rack and gear mechanism described, rotates the offset arms 41 and turns the rollers 43 progressively around the beads as indicated in Figs. 11, 12, and 13. The axes of the shanks 40 pass substantially through the beads upon which they act and the offset is so chosen that the path of the surface of the roller will remain in constant contact with the material on the bead during the turning movement. It will be understood that during this operation the drum 15 is in constant rotation so that all portions of the fabric around the bead are operated upon successively.

While the surface of the rollers remains constantly in contact with the material during the period in which they are twisted around the beads as described, the curvature of the face of the roller indicated at 49 is preferably taken in accordance with the disclosures of Figs. 11 to 13. From a study of these figures it will be seen that the surface 49 is concentric with the bead wire 50 only in the position of Fig. 12. In the position of Fig. 11 only the portion of the curve 49 of least circumference contacts with the bead and in the position of Fig. 13 only that portion of greatest circumference makes contact. This gives practically a line contact upon the bead material, augmenting the effective pressure bonding the rubberized plies together and having the further advantage that, as shown in Fig. 13, the roller extends and bears only upon the underside of the bead, giving a thorough pressure to the materials at this point without the necessity of rocking the tube 22 to cause an outward pressure to be given. At the position of Fig. 13 the yoke 42 bears upon the sloping portions 19 of the drum 15 and assists the pressure at this period.

The apparatus described can be adjusted very simply to accommodate different sizes of tires. In order to accomplish this adjustment the screws 47 and the nut 37 are all loosened. The bushings 44 can then be moved along the tube to the desired position without causing any rotation of the arms 41 due to the fact that with the nut 37 loose the rods 33 slide freely through the split cylinder 32. When the parts are located in the desired position the screws 47 and the nut 37 are tightly clamped and the adjustment is complete.

Having thus described my invention, I claim:

1. A device for forming material around the beads of a flat band tire casing which comprises a rotatable tube, a pair of bearings held on the tube, offset arms pivoted to and extending through the bearings, material shaping rolls pivoted on the arms, pinions mounted upon the arms inside the tube, racks meshing with the two gears respectively in diametrically opposite positions, a slide to which the racks are joined, a handle pivoted to the tube upon an axis at right angles to the axis of the tube, and a link joining the handle to the slide, the handle serving both to rotate the tube to bring the rolls adjacent the bead and to reciprocate the slide and racks axially of the tube to rotate the offset arms and thereby carry the rolls about the tire beads in opposite directions.

2. A device for forming material around the beads of a flat band tire casing which comprises a rotatable support, arms projecting from the support, material shaping means carried by the arms, and a single means for rotating the support to bring the rolls adjacent the tire and for moving the shaping means around the tire beads.

3. A device for building flat band tire casings which comprises a drum having recesses underlying the bead portions of the tire casing, and material shaping means movable around the tire beads and into the recesses whereby material can be folded from the outer face of the tire around to and against that face adjacent the drum.

4. A device for building flat band tire casings which comprises a drum having recesses underlying the positions occupied by a tire casing thereon, a roller having concave faces, and a mounting for the rollers constraining them for bodily movement around the tire beads so that the point of contact of the concave faces of the rollers shifts progressively from one edge to the other of the concavity as the rollers are moved.

5. A device for forming material around the beads of a flat band tire casing which comprises a rotatable support for a tire, a pair of rotatable rolls, and supporting means for the rolls permitting rotation of the axes of the rolls in a plane passing substantially through the axis of the tire support.

6. A device for forming material around the beads of a flat band tire casing which comprises a rotatable support for a tire, a pair of rotatable rolls, supporting means for the rolls permitting rotation of the axes of the rolls in a plane passing substantially through the axis of the tire support, and means for rotating the axes of the rolls simultaneously and in opposite directions in such plane.

7. A device for forming material around the beads of a flat band tire casing which comprises a rotatable support for a tire, a pair of rotatable rolls, and supports for the rolls pivoted so that their axes make an angle of between 87° and 90° with a plane joining the axis of the tire support with the centers of the rolls.

WILLIAM F. IRREGANG.